United States Patent
Kondo et al.

(10) Patent No.: US 12,269,904 B2
(45) Date of Patent: Apr. 8, 2025

(54) SULFUR-MODIFIED CHLOROPRENE RUBBER AND METHOD FOR PRODUCING SAME, SULFUR-MODIFIED CHLOROPRENE RUBBER COMPOSITION, VULCANIZATE, AND MOLDED ARTICLE

(71) Applicant: Denka Company Limited, Tokyo (JP)

(72) Inventors: Atsunori Kondo, Tokyo (JP); Takashi Sunada, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 815 days.

(21) Appl. No.: 17/609,987

(22) PCT Filed: May 8, 2020

(86) PCT No.: PCT/JP2020/018742
§ 371 (c)(1),
(2) Date: Nov. 9, 2021

(87) PCT Pub. No.: WO2020/230746
PCT Pub. Date: Nov. 19, 2020

(65) Prior Publication Data
US 2022/0213235 A1    Jul. 7, 2022

(30) Foreign Application Priority Data
May 13, 2019    (JP) ................. 2019-090613

(51) Int. Cl.
| C08K 5/47 | (2006.01) |
| C08C 19/20 | (2006.01) |
| C08K 5/3445 | (2006.01) |
| C08L 11/00 | (2006.01) |

(52) U.S. Cl.
CPC ............ *C08C 19/20* (2013.01); *C08K 5/3445* (2013.01); *C08K 5/47* (2013.01); *C08L 11/00* (2013.01)

(58) Field of Classification Search
CPC ....... C08C 19/20; C08C 19/22; C08K 5/3445; C08K 5/47; C08L 11/00
See application file for complete search history.

(56) References Cited

U.S. PATENT DOCUMENTS

| 2014/0350190 A1 | 11/2014 | Kobayashi et al. |
| 2015/0203613 A1 | 7/2015 | Sunada et al. |

FOREIGN PATENT DOCUMENTS

| CN | 104662079 A | 5/2015 | |
| CN | 105037858 A | * 11/2015 | |
| EP | 2189498 A1 | 5/2010 | |
| EP | 2684913 A1 | 1/2014 | |
| JP | 47-002432 | * 2/1972 | |
| JP | S47002432 A | 2/1972 | |
| JP | 2002060550 A | 2/2002 | |
| JP | 2012111899 A | 6/2012 | |
| JP | 2013-171711 | * 9/2013 | |
| JP | 2013171711 A | 9/2013 | |
| JP | 2016023191 A | 2/2016 | |
| JP | 2016141736 A | 8/2016 | |
| WO | WO-2015177838 A1 | * 11/2015 | ............... B32B 1/02 |

OTHER PUBLICATIONS

EPO Extended European Search Report for corresonding EP Application No. 20806017.8; Issued on Jun. 8, 2022.
PCT International Preliminary Report on Patentability with Written Opinion of the International Searching Authority for International Application No. PCT/JP2020/018742; Date of Mailing, Nov. 25, 2021.
International Search Report for International Application No. PCT/JP2020/018742; Date of Mailing, Jul. 14, 2020.

* cited by examiner

*Primary Examiner* — Kumar R Bhushan
(74) *Attorney, Agent, or Firm* — CANTOR COLBURN LLP

(57) ABSTRACT

A sulfur-modified chloroprene rubber having a functional group A represented by specific General Formula (A) and positioned at a molecular terminal and a functional group B represented by specific General Formula (B) and positioned at a molecular terminal, in which a mass ratio B/A of a content of the functional group B with respect to a content of the functional group A is more than 0 and 6.00 or less, and a total amount of the functional group A and the functional group B is 0.10 to 0.60% by mass.

18 Claims, No Drawings

SULFUR-MODIFIED CHLOROPRENE RUBBER AND METHOD FOR PRODUCING SAME, SULFUR-MODIFIED CHLOROPRENE RUBBER COMPOSITION, VULCANIZATE, AND MOLDED ARTICLE

CROSS REFERENCE TO RELATED APPLICATIONS

This is the U.S. national stage of application No. PCT/JP2020/018742, filed on May 8, 2020. Priority under 35 U.S.C. § 119 (a) and 35 U.S.C. § 365 (b) is claimed from Japanese Application No. 2019-090613, filed May 13, 2019, the disclosure of which is also incorporated herein by reference.

TECHNICAL FIELD

The present invention relates to a sulfur-modified chloroprene rubber, a method for producing the same, a sulfur-modified chloroprene rubber composition, a vulcanizate, and a molded article.

BACKGROUND ART

Sulfur-modified chloroprene rubbers have been widely used as materials for common industrial transmission belts or conveyor belts; automobile air springs; vibration-proof rubbers; sponges; and the like, while utilizing excellent dynamic properties of vulcanizates thereof. Since these products are used in a high temperature environment, there are problems in that the rubbers themselves deteriorate and in that product lifetime is shortened. Thus, there exists a craving for development of a sulfur-modified chloroprene rubber excellent in heat resistance.

As a technique of improving the heat resistance of rubbers, known is a rubber composition containing a chloroprene rubber, in which the rubber composition does not contain sulfur as a cross-linking agent and contains zinc oxide, a zinc powder, and magnesium oxide, and satisfies A≤1, 10≤B≤15, 2.5≤B/C≤5 when a content of the zinc oxide is designated as A (parts by weight), a content of the zinc powder is designated as B (parts by weight), and a content of the magnesium oxide is designated as C (parts by weight) with respect to 100 parts by weight of the chloroprene rubber (see, for example, Patent Literature 1 below).

CITATION LIST

Patent Literature

Patent Literature 1: Japanese Unexamined Patent Publication No. 2016-23191
Patent Literature 2: Japanese Unexamined Patent Publication No. 2012-111899
Patent Literature 3: Japanese Unexamined Patent Publication No. 2016-141736

SUMMARY OF INVENTION

Technical Problem

Regarding the sulfur-modified chloroprene rubber, although a technique of improving physical properties of a vulcanizate thereof is being developed, heat resistance is demanded to be further improved.

In this regard, an aspect of the present invention is intended to provide a sulfur-modified chloroprene rubber with which a vulcanizate having excellent heat resistance is obtained. Another aspect of the present invention is intended to provide a sulfur-modified chloroprene rubber composition containing the above-described sulfur-modified chloroprene rubber. Still another aspect of the present invention is intended to provide a vulcanizate of the above-described sulfur-modified chloroprene rubber. Still another aspect of the present invention is intended to provide a molded article composed of the above-described vulcanizate (a molded article using the vulcanizate). Still another aspect of the present invention is intended to provide a method for producing the above-described sulfur-modified chloroprene rubber.

Solution to Problem

The inventors of the present application have conducted intensive studies in order to solve such problems, and as a result, they have succeeded in producing a sulfur-modified chloroprene rubber with which a vulcanizate having excellent heat resistance is obtained, by introducing a specific structure in a molecular terminal of a sulfur-modified chloroprene rubber, thereby completing the present invention.

An aspect of the present invention provides a sulfur-modified chloroprene rubber having a functional group A represented by General Formula (A) below and positioned at a molecular terminal and a functional group B represented by General Formula (B) below and positioned at a molecular terminal, in which a mass ratio B/A of a content of the functional group B with respect to a content of the functional group A is more than 0 and 6.00 or less, and a total amount of the functional group A and the functional group B is 0.10 to 0.60% by mass.

[Chemical Formula 1]

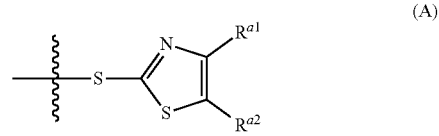

(In the formula, $R^{a1}$ and $R^{a2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, and $R^{a1}$ and $R^{a2}$ may bond with each other to form a ring which may have a substituent.)

[Chemical Formula 2]

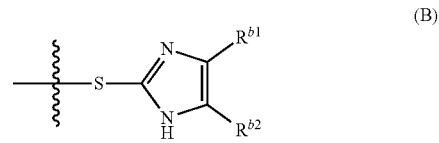

(In the formula, $R^{b1}$ and $R^{b2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, and $R^{b1}$ and $R^{b2}$ may bond with each other to form a ring which may have a substituent.)

According to the sulfur-modified chloroprene rubber of the aspect of the present invention, a vulcanizate having excellent heat resistance can be obtained.

Another aspect of the present invention provides a sulfur-modified chloroprene rubber composition containing the aforementioned sulfur-modified chloroprene rubber. Still another aspect of the present invention provides a vulcanizate of the aforementioned sulfur-modified chloroprene rubber or a vulcanizate of the aforementioned sulfur-modified chloroprene rubber composition. Still another aspect of the present invention provides a molded article composed of the aforementioned vulcanizate. Still another aspect of the present invention provides a method for producing the aforementioned sulfur-modified chloroprene rubber or a method for producing the sulfur-modified chloroprene rubber of the aforementioned sulfur-modified chloroprene rubber composition, the method having a step of subjecting chloroprene to emulsion polymerization in the presence of sulfur to obtain a polymer, and a mixing step of mixing the polymer, a thiazole, and an imidazole.

Advantageous Effects of Invention

According to an aspect of the present invention, it is possible to provide a sulfur-modified chloroprene rubber with which a vulcanizate having excellent heat resistance is obtained. According to another aspect of the present invention, it is possible to provide a sulfur-modified chloroprene rubber composition containing the above-described sulfur-modified chloroprene rubber. According to still another aspect of the present invention, it is possible to provide a vulcanizate of the above-described sulfur-modified chloroprene rubber. According to still another aspect of the present invention, it is possible to provide a molded article composed of the above-described vulcanizate (a molded article using the vulcanizate). According to still another aspect of the present invention, it is possible to provide a method for producing the above-described sulfur-modified chloroprene rubber.

DESCRIPTION OF EMBODIMENTS

Hereinafter, preferred embodiments for carrying out the present invention will be described. Embodiments described below are only typical exemplary embodiments of the present invention and the scope of the present invention is not restricted thereby at all.

In the present specification, a numerical range that has been indicated by use of "to" indicates the range that includes the numerical values which are described before and after "to", as the minimum value and the maximum value, respectively. "A or more" of the numerical range means A and a range of more than A. "A or less" of the numerical range means A and a range of less than A. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in Examples. "A or B" may include any one of A and B, and may also include both of A and B. Materials listed as examples in the present specification may be used singly or in combinations of two or more kinds thereof, unless otherwise specified. In a case where a plurality of substances corresponding to each component exist in the composition, the content of each component in the composition means the total amount of the plurality of substances that exist in the composition, unless otherwise specified. An "alkyl group" may be linear, branched or cyclic, unless otherwise specified. A "thiazole" means a compound having a thiazole ring, and an "imidazole" means a compound having an imidazole ring. The same is also applied to a "benzothiazole", a "benzimidazole", and the like.

<Sulfur-Modified Chloroprene Rubber>

A sulfur-modified chloroprene rubber of the present embodiment has a functional group A represented by General Formula (A) below and positioned at a molecular terminal (hereinafter, referred to as "terminal functional group A") and a functional group B represented by General Formula (B) below and positioned at a molecular terminal (hereinafter, referred to as "terminal functional group B"), in which a mass ratio B/A of a content of the functional group B with respect to a content of the functional group A is more than 0 and 6.00 or less, and a total amount of the functional group A and the functional group B is 0.10 to 0.60% by mass. That is, the sulfur-modified chloroprene rubber of the present embodiment is a sulfur-modified chloroprene rubber having a structure represented by General Formula (A) below and a structure represented by General Formula (B) below at a molecular terminal, in which the mass ratio B/A of the terminal functional group A represented by General Formula (A) below and the terminal functional group B represented by General Formula (B) below is more than 0 and 6.00 or less, and the total amount (A+B) of the terminal functional group A and the terminal functional group B in 100 parts by mass of the sulfur-modified chloroprene rubber is 0.10 to 0.60 parts by mass.

[Chemical Formula 3]

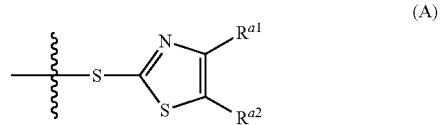

(A)

(In the formula, $R^{a1}$ and $R^{a2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, $R^{a1}$ and $R^{a2}$ may be identical to or different from each other, and $R^{a1}$ and $R^{a2}$ may bond with each other to form a ring which may have a substituent. $R^{a1}$ and $R^{a2}$ can bond with each other to form a ring which has a substituent or a ring which does not have a substituent.)

[Chemical Formula 4]

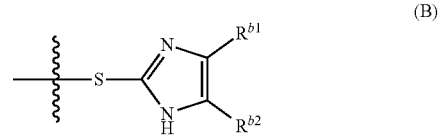

(B)

(In the formula, $R^{b1}$ and $R^{b2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, $R^{b1}$ and $R^{b2}$ may be identical to or different from each other, and $R^{b1}$ and $R^{b2}$ may bond with each other to form a ring which may have a substituent. $R^{b1}$ and $R^{b2}$ can bond with each other to form a ring which has a substituent or a ring which does not have a substituent.)

A vulcanizate can be obtained by vulcanizing the sulfur-modified chloroprene rubber of the present embodiment. According to the sulfur-modified chloroprene rubber of the present embodiment, a vulcanizate having excellent heat resistance is obtained as a vulcanizate obtained by vulcanizing the sulfur-modified chloroprene rubber.

Incidentally, conventionally, there also exists a craving for development of a sulfur-modified chloroprene rubber excellent in compression set. As a technique of improving the compression set of a rubber, known is a chloroprene rubber composition containing 100 parts by mass in total of a chloroprene rubber and natural rubber, 0.1 to 10 parts by mass of a copolymer of styrene and butadiene, 0.1 to 3 parts by mass of ethylene thiourea, and 0.1 to 3 parts by mass of dipentamethylenethiuram tetrasulfide (see, for example, Patent Literature 2 above).

Further, as a technique of improving the scorch resistance of a chloroprene rubber, known is a rubber composition containing 100 parts by weight of a chloroprene rubber, 1 to 10 parts by weight of an amine salt of dithiocarbamic acid, and 0.1 to 5 parts by weight of at least one compound selected from the group consisting of a thiuram-based vulcanization accelerator, a guanidine-based vulcanization accelerator, a thiazole-based vulcanization accelerator, and a sulfenamide-based vulcanization accelerator (see, for example, Patent Literature 3 above).

However, in the methods of the aforementioned related arts, the degree of freedom of blending is small, and conventionally, a technique of obtaining excellent scorch resistance and heat resistance while reducing compression set in a vulcanizate has not hitherto existed. On the other hand, the inventors of the present application have conducted intensive studies, and as a result, they have succeeded in producing a sulfur-modified chloroprene rubber capable of obtaining a vulcanizate having excellent scorch resistance and heat resistance and having reduced compression set, by introducing the aforementioned specific structure in a molecular terminal of a sulfur-modified chloroprene rubber. That is, according to the present embodiment, it is also possible to provide a sulfur-modified chloroprene rubber capable of obtaining a vulcanizate having excellent scorch resistance and heat resistance and having reduced compression set (having excellent compression set resistance).

The sulfur-modified chloroprene rubber of the present embodiment is a polymer having a structural unit derived from chloroprene (2-chloro-1,3-butadiene). The sulfur-modified chloroprene rubber includes a sulfur atom in a molecule chain, and may include a sulfur atom in a main chain. The sulfur-modified chloroprene rubber may include a polysulfide bond ($S_2$ to $S_8$) in a molecule chain, and may include a polysulfide bond ($S_2$ to $S_8$) in a main chain.

The sulfur-modified chloroprene rubber of the present embodiment may have a structural unit derived from a monomer copolymerizable with chloroprene. Examples of the monomer copolymerizable with chloroprene include 2,3-dichloro-1,3-butadiene, 1-chloro-1,3-butadiene, styrene, acrylonitrile, methacrylonitrile, isoprene, butadiene, methacrylic acid, and esters. The monomer copolymerizable with chloroprene may be used alone or in combination of two or more kinds thereof.

For example, when 2,3-dichloro-1,3-butadiene among the monomers copolymerizable with chloroprene is used, the crystallization speed of a sulfur-modified chloroprene rubber to be obtained can be delayed. A sulfur-modified chloroprene rubber with a slow crystallization speed can maintain rubber elasticity even in a low-temperature environment, and for example, low-temperature compression set can be improved.

In the case of using the monomer copolymerizable with chloroprene, the used amount of the monomer copolymerizable with chloroprene (the content of the structural unit derived from the monomer copolymerizable with chloroprene) is preferably 10% by mass or less in all the monomers including chloroprene (the total amount of the structural units constituting the sulfur-modified chloroprene rubber). When this used amount is 10% by mass or less, the heat resistance of the sulfur-modified chloroprene rubber to be obtained is easily improved and deterioration in processability is easily suppressed. From the same viewpoints, the used amount of chloroprene (the content of the structural unit derived from chloroprene) is preferably 90% by mass or more, 92% by mass or more, 95% by mass or more, or 98% by mass or more in all the monomers including chloroprene (the total amount of the structural units constituting the sulfur-modified chloroprene rubber). An aspect in which the structural unit constituting the sulfur-modified chloroprene rubber is composed of the structural unit derived from chloroprene (substantially 100% by mass of the structural unit constituting the sulfur-modified chloroprene rubber is the structural unit derived from chloroprene) may be employed.

In the sulfur-modified chloroprene rubber of the present embodiment, the terminal functional group A may be positioned at the terminal of the main chain and/or the side chain. The terminal functional group A can be obtained, for example, by using a thiazole in a plasticization step described below. Examples of the substituent with respect to the alkyl group for $R^{a1}$ or $R^{a2}$ include a halogen atom, a hydroxy group, an alkoxy group, a carboxy group, a carboxylate group, a cyano group, a sulfo group, a sulfonate group, a nitro group, and an amino group. Examples of the substituent with respect to the arylthio group for $R^{a1}$ or $R^{a2}$ include an alkyl group, a halogen atom, a hydroxy group, an alkoxy group, a carboxy group, a carboxylate group, a cyano group, a sulfo group, a sulfonate group, a nitro group, and an amino group.

In the terminal functional group A, $R^{a1}$ and $R^{a2}$ may bond with each other to form a ring which may have a substituent. Examples of the ring include an aromatic ring, an alicyclic ring, and a heterocyclic ring. Examples of the substituent with respect to the ring include an alkyl group, a halogen atom, a hydroxy group, an alkoxy group, a carboxy group, a carboxylate group, a cyano group, a sulfo group, a sulfonate group, a nitro group, and an amino group. Examples of the alkyl group that is a substituent with respect to the ring include an alkyl group having 1, 2, 3, or 4 carbon atoms. From the viewpoint of easily obtaining a vulcanizate having excellent scorch resistance and heat resistance and having reduced compression set, the terminal functional group A preferably has a benzothiazole ring formed by $R^{a1}$ and $R^{a2}$ bonding with each other. The benzothiazole ring may not have a substituent. In a case where the benzothiazole ring has a substituent, the substituent is preferably an alkyl group, and more preferably an alkyl group bonded in 4-position of the benzothiazole ring, from the viewpoint of easily obtaining a vulcanizate having excellent scorch resistance and heat resistance and having reduced compression set.

In the sulfur-modified chloroprene rubber of the present embodiment, the terminal functional group B may be positioned at the terminal of the main chain and/or the side chain. The terminal functional group B can be obtained, for example, by using an imidazole in a plasticization step described below. Examples of the substituent with respect to the alkyl group for $R^{b1}$ or $R^{b2}$ include a halogen atom, a hydroxy group, an alkoxy group, a carboxy group, a carboxylate group, a cyano group, a sulfo group, a sulfonate group, a nitro group, and an amino group. Examples of the substituent with respect to the arylthio group for $R^{b1}$ or $R^{b2}$ include an alkyl group, a halogen atom, a hydroxy group, an alkoxy group, a carboxy group, a carboxylate group, a cyano group, a sulfo group, a sulfonate group, a nitro group, and an amino group.

In the terminal functional group B, $R^{b1}$ and $R^{b2}$ may bond with each other to form a ring which may have a substituent. Examples of the ring include an aromatic ring, an alicyclic ring, and a heterocyclic ring. Examples of the substituent with respect to the ring include an alkyl group, a halogen atom, a hydroxy group, an alkoxy group, a carboxy group, a carboxylate group, a cyano group, a sulfo group, a sulfonate group, a nitro group, and an amino group. Examples of the alkyl group that is a substituent with respect to the ring include an alkyl group having 1, 2, 3, or 4 carbon atoms. From the viewpoint of easily obtaining a vulcanizate having excellent scorch resistance and heat resistance and having reduced compression set, the terminal functional group B preferably has a benzimidazole ring formed by $R^{b1}$ and $R^{b2}$ bonding with each other. The benzimidazole ring may not have a substituent. In a case where the benzimidazole ring has a substituent, the substituent is preferably a carboxy group or a carboxylate group, and more preferably a carboxy group or a carboxylate group bonded in 5-position of the benzimidazole ring, from the viewpoint of easily obtaining a vulcanizate having excellent scorch resistance and heat resistance and having reduced compression set.

The content of the terminal functional group A is preferably in the following range on the basis of the total amount of the sulfur-modified chloroprene rubber (that is, the sulfur-modified chloroprene rubber preferably contains the following numerical value content (unit: parts by mass) of the terminal functional group A with respect to 100 parts by mass of the sulfur-modified chloroprene rubber). The content of the terminal functional group A is preferably 0.50% by mass or less, 0.45% by mass or less, 0.43% by mass or less, 0.40% by mass or less, 0.38% by mass or less, 0.35% by mass or less, 0.30% by mass or less, 0.25% by mass or less, 0.23% by mass or less, 0.20% by mass or less, 0.18% by mass or less, 0.16% by mass or less, or 0.15% by mass or less, from the viewpoint of further improving the heat resistance and further reducing the compression set in a vulcanizate to be obtained. The content of the terminal functional group A is preferably 0.015% by mass or more, 0.03% by mass or more, 0.04% by mass or more, 0.05% by mass or more, 0.06% by mass or more, 0.08% by mass or more, 0.09% by mass or more, 0.10% by mass or more, 0.11% by mass or more, 0.12% by mass or more, 0.13% by mass or more, 0.14% by mass or more, or 0.15% by mass or more, from the viewpoint of further improving the scorch resistance and the heat resistance and further reducing the compression set in a vulcanizate to be obtained. From these viewpoints, the content of the terminal functional group A is preferably 0.015 to 0.50% by mass, or 0.05 to 0.40% by mass. The content of the terminal functional group A may be 0.14% by mass or less, 0.13% by mass or less, 0.12% by mass or less, 0.11% by mass or less, 0.10% by mass or less, 0.09% by mass or less, 0.08% by mass or less, 0.06% by mass or less, 0.05% by mass or less, or 0.04% by mass or less. The content of the terminal functional group A is preferably 0.16% by mass or more, 0.18% by mass or more, 0.20% by mass or more, 0.23% by mass or more, 0.25% by mass or more, 0.30% by mass or more, 0.35% by mass or more, 0.38% by mass or more, 0.40% by mass or more, or 0.43% by mass or more, from the viewpoint of further improving the heat resistance of a vulcanizate to be obtained. The content of the terminal functional group A can be adjusted by the amount of the thiazole used in the plasticization step described below, the plasticization time and the plasticization temperature of the plasticization step, and the like.

The content of the terminal functional group B is preferably in the following range on the basis of the total amount of the sulfur-modified chloroprene rubber (that is, the sulfur-modified chloroprene rubber preferably contains the following numerical value content (unit: parts by mass) of the terminal functional group B with respect to 100 parts by mass of the sulfur-modified chloroprene rubber). The content of the terminal functional group B is preferably 0.50% by mass or less, 0.45% by mass or less, 0.40% by mass or less, 0.35% by mass or less, 0.30% by mass or less, 0.25% by mass or less, 0.23% by mass or less, 0.22% by mass or less, 0.21% by mass or less, 0.20% by mass or less, 0.18% by mass or less, 0.15% by mass or less, or 0.13% by mass or less, from the viewpoint of further improving the scorch resistance and the heat resistance and further reducing the compression set in a vulcanizate to be obtained. The content of the terminal functional group B is more than 0% by mass, and is preferably 0.01% by mass or more, 0.03% by mass or more, 0.04% by mass or more, 0.05% by mass or more, or 0.06% by mass or more, from the viewpoint of further improving the scorch resistance and the heat resistance and further reducing the compression set in a vulcanizate to be obtained. From these viewpoints, the content of the terminal functional group B is preferably more than 0% by mass and 0.50% by mass or less, 0.01 to 0.50% by mass, or 0.05 to 0.40% by mass. The content of the terminal functional group B may be 0.12% by mass or less, 0.11% by mass or less, 0.10% by mass or less, 0.09% by mass or less, 0.08% by mass or less, 0.07% by mass or less, or 0.06% by mass or less. The content of the terminal functional group B may be 0.07% by mass or more, 0.08% by mass or more, 0.09% by mass or more, 0.10% by mass or more, 0.11% by mass or more, 0.12% by mass or more, 0.13% by mass or more, 0.15% by mass or more, 0.18% by mass or more, 0.20% by mass or more, 0.21% by mass or more, 0.22% by mass or more, 0.23% by mass or more, 0.25% by mass or more, 0.30% by mass or more, or 0.35% by mass or more. The content of the terminal functional group B can be adjusted by the amount of the imidazole used in the plasticization step described below, the plasticization time and the plasticization temperature of the plasticization step, and the like.

The mass ratio B/A of the content of the terminal functional group B with respect to the content of the terminal functional group A is more than 0 and 6.00 or less. When the mass ratio B/A is more than 6.00, the compression set resistance and the heat resistance of a vulcanizate to be obtained are deteriorated.

The mass ratio B/A is preferably 5.80 or less, 5.75 or less, 5.50 or less, 5.00 or less, 4.50 or less, 4.00 or less, 3.75 or less, 3.50 or less, 3.25 or less, 3.00 or less, 2.75 or less, 2.50 or less, 2.25 or less, 2.00 or less, 1.50 or less, 1.25 or less, 1.00 or less, 0.90 or less, or 0.87 or less, from the viewpoint of easily obtaining a vulcanizate having excellent scorch resistance and heat resistance and having reduced compression set. The mass ratio B/A is preferably 0.80 or less, 0.50 or less, 0.47 or less, 0.46 or less, 0.45 or less, 0.40 or less, 0.35 or less, or 0.30 or less, from the viewpoint of easily obtaining a vulcanizate having further excellent scorch resistance. The mass ratio B/A may be 0.25 or less or 0.24 or less. The mass ratio B/A is preferably 0.01 or more, 0.05 or more, 0.1 or more, 0.15 or more, 0.20 or more, or 0.24 or more, from the viewpoint of easily obtaining a vulcanizate having excellent scorch resistance and heat resistance and having reduced compression set. The mass ratio B/A is preferably 0.25 or more, 0.30 or more, 0.35 or more, 0.40 or more, 0.45 or more, or 0.46 or more, from the viewpoint of easily obtaining a vulcanizate having further excellent heat resistance and having further reduced compression set. The mass ratio B/A may be 0.47 or more, 0.50 or more, 0.80 or more, 0.87 or more, 0.90 or more, 1.00 or more, 1.25 or more, 1.50 or more, 2.00 or more, 2.25 or more, 2.50 or more, 2.75 or more, 3.00 or more, 3.25 or more, 3.50 or more, 3.75 or more, 4.00 or more, 4.50 or more, 5.00 or more, 5.50 or more, or 5.75 or more. The mass ratio B/A is preferably 0.20 to 6.00.

The total amount of the terminal functional group A and the terminal functional group B (the total of the contents of the terminal functional group A and the terminal functional group B; the mass total (A+B)) is 0.10 to 0.60% by mass on the basis of the total amount of the sulfur-modified chloroprene rubber. When the mass total (A+B) is less than 0.10% by mass, the scorch resistance, the compression set resistance, and the heat resistance of a vulcanizate to be obtained are deteriorated. When the mass total (A+B) is more than 0.60% by mass, a decrease in Mooney viscosity of a sulfur-modified chloroprene rubber composition to be obtained is significant, which is not practical (a vulcanizate is not obtained).

The mass total (A+B) is preferably in the following range on the basis of the total amount of the sulfur-modified chloroprene rubber. The mass total (A+B) is preferably 0.12% by mass or more, 0.15% by mass or more, or 0.19% by mass or more, from the viewpoint of easily obtaining a vulcanizate having excellent scorch resistance and heat resistance and having reduced compression set. The mass total (A+B) is preferably 0.20% by mass or more, 0.25% by mass or more, 0.27% by mass or more, 0.28% by mass or more, 0.29% by mass or more, 0.30% by mass or more, 0.35% by mass or more, 0.40% by mass or more, 0.45% by mass or more, 0.46% by mass or more, 0.47% by mass or more, 0.50% by mass or more, 0.55% by mass or more, or 0.56% by mass or more, from the viewpoint of easily obtaining a vulcanizate having further excellent scorch resistance. The mass total (A+B) is preferably 0.56% by mass or less, 0.55% by mass or less, 0.50% by mass or less, 0.47% by mass or less, 0.46% by mass or less, 0.45% by mass or less, 0.40% by mass or less, 0.35% by mass or less, 0.30% by mass or less, 0.29% by mass or less, or 0.28% by mass or less, from the viewpoint of easily obtaining a vulcanizate having excellent heat resistance and having reduced compression set. The mass total (A+B) may be 0.27% by mass or less, 0.25% by mass or less, 0.20% by mass or less, or 0.19% by mass or less.

The contents of the terminal functional group A and the terminal functional group B in the sulfur-modified chloroprene rubber can be quantified by the procedure described in Examples.

The sulfur-modified chloroprene rubber of the present embodiment may not have a functional group represented by General Formula (C) below, and may not have a functional group represented by General Formula (C) below and positioned at a molecular terminal.

[Chemical Formula 5]

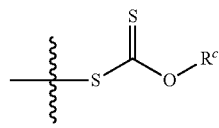

(C)

(In the formula, $R^c$ represents a hydrogen atom or an alkyl group having 1 to 4 carbon atoms which may have a substituent.)

<Method for Producing Sulfur-Modified Chloroprene Rubber>

A method for producing the sulfur-modified chloroprene rubber of the present embodiment is a method for producing the sulfur-modified chloroprene rubber of the present embodiment or a production method for obtaining the sulfur-modified chloroprene rubber of a sulfur-modified chloroprene rubber composition described below. The method for producing the sulfur-modified chloroprene rubber of the present embodiment has a polymerization step of subjecting chloroprene to emulsion polymerization in the presence of sulfur ($S_8$) to obtain a polymer, and a plasticization step (mixing step) of mixing the above-described polymer, a thiazole, and an imidazole. In the method for producing the sulfur-modified chloroprene rubber of the present embodiment, a sulfur-modified chloroprene rubber may be obtained as a constituent of the sulfur-modified chloroprene rubber composition. An aspect of the method for producing the sulfur-modified chloroprene rubber of the present embodiment has a polymerization step of subjecting at least chloroprene rubber and sulfur to emulsion polymerization to obtain a polymer solution and a plasticization step of plasticizing a polymer in the polymer solution by adding a thiazole and an imidazole into the polymer solution.

In the method for producing the sulfur-modified chloroprene rubber of the present embodiment, for example, sulfur can be introduced in the polymer (for example, the main chain of the polymer), and a polysulfide bond ($S_2$ to $S_8$) can also be introduced. The sulfur-modified chloroprene rubber of the present embodiment encompasses a latex obtained by using a thiazole and an imidazole to plasticize a sulfur-modified chloroprene polymer containing an introduced-sulfur, which is obtained, in the presence of sulfur, by subjecting a single substance of chloroprene to emulsion polymerization or by subjecting chloroprene and another monomer to emulsion polymerization, and a sulfur-modified chloroprene rubber obtained by drying and washing this latex by a general method.

Hereinafter, the detailed description will be given along the method for producing the sulfur-modified chloroprene rubber.

(Polymerization Step)

In the method for producing the sulfur-modified chloroprene rubber of the present embodiment, first, in the polymerization step, chloroprene is subjected to emulsion polymerization in the presence of sulfur to obtain a polymer. The polymer may be a polymer in a polymer solution. In the polymerization step, as necessary, chloroprene and the aforementioned monomer copolymerizable with chloroprene may be subjected to emulsion polymerization. The used amount of chloroprene or the used amount of the monomer copolymerizable with chloroprene is preferably the aforementioned used amount.

The used amount of sulfur ($S_8$) in the emulsion polymerization is preferably in the following range with respect to 100 parts by mass of monomers (the total of monomers to be polymerized). The used amount of sulfur is preferably 0.01 parts by mass or more and more preferably 0.1 parts by mass or more, from the viewpoint of easily obtaining sufficient mechanical properties or dynamic properties of a sulfur-modified chloroprene rubber to be obtained. The used amount of sulfur is preferably 0.6 parts by mass or less and more preferably 0.5 parts by mass or less, from the viewpoint of easy processing by suppression of an excessive increase in adhesion of a sulfur-modified chloroprene rubber to be obtained to a metal. From these viewpoints, the used amount of sulfur is preferably 0.01 to 0.6 parts by mass and more preferably 0.1 to 0.5 parts by mass.

As an emulsifier used in emulsion polymerization, one or two or more kinds of known emulsifiers, which can be used in emulsion polymerization of chloroprene, can be freely selected and used. Examples of the emulsifier include rosin acids, fatty acids, a metal salt of aromatic sulfonic acid formalin condensate, sodium dodecylbenzenesulfonate, potassium dodecylbenzenesulfonate, sodium alkyldiphenyl ether sulfonate, potassium alkyldiphenyl ether sulfonate, sodium polyoxyethylene alkyl ether sulfonate, sodium polyoxypropylene alkyl ether sulfonate, potassium polyoxyethylene alkyl ether sulfonate, and potassium polyoxypropylene alkyl ether sulfonate. From the viewpoint of easily obtaining a vulcanizate having excellent scorch resistance and heat resistance and having reduced compression set, the emulsifier is preferably rosin acids. The "rosin acids" mean rosin acid, disproportionated rosin acid, alkali metal salts of disproportionated rosin acid (for example, disproportionated potassium rosinate), and the like. Examples of the constituent of disproportionated rosin acid include sesquiterpene, 8,5-isopimaric acid, dihydropimaric acid, secodehydroabietic acid, dihydroabietic acid, deisopropyldehydroabietic acid, and demethyldehydroabietic acid. Examples of the fatty acids include fatty acids (for example, saturated or unsaturated fatty acids having 6 to 22 carbon atoms) and metal salts of fatty acids (for example, sodium laurylsulfate).

From the viewpoint of easily obtaining a vulcanizate having excellent scorch resistance and heat resistance and having reduced compression set, the emulsifier is preferably a metal salt of aromatic sulfonic acid formalin condensate and more preferably a sodium salt of β-naphthalene sulfonic acid formalin condensate. The sodium salt of β-naphthalene sulfonic acid formalin condensate is an emulsifier which is commonly used, stability is improved by adding a small amount thereof, and a latex can be stably produced without aggregation and precipitation in the production process. As another emulsifier which is suitably used, for example, an aqueous alkali soap solution composed of a mixture of alkali metal salts of disproportionated rosin acid and saturated or unsaturated fatty acids having 6 to 22 carbon atoms is mentioned.

The pH of the emulsion (for example, the aqueous emulsion) at the time of emulsion polymerization initiation is preferably 10.5 or more. Herein, the "emulsion" is a liquid mixture of chloroprene and other components (such as a monomer copolymerizable with chloroprene, an emulsifier, and sulfur ($S_8$)) immediately before emulsion polymerization initiation. The "emulsion" also encompasses a case where the composition sequentially varies by adding these other components (such as a monomer copolymerizable with chloroprene, and sulfur ($S_8$)) afterward, portionwise, etc. When the pH of the emulsion is 10.5 or more, polymer precipitation or the like during polymerization is prevented so that the polymerization can be stably controlled. This effect can be particularly suitably obtained in the case of using rosin acids as an emulsifier. The pH of the emulsion can be adjusted by the amount of the alkali component such as sodium hydroxide or potassium hydroxide, which is present during emulsion polymerization.

The polymerization temperature of emulsion polymerization is preferably 0° C. to 55° C. and more preferably 30° C. to 55° C., from the viewpoint of excellent polymerization regulation and productivity.

As a polymerization initiator, potassium persulfate, benzoyl peroxide, ammonium persulfate, hydrogen peroxide, or the like, which is usually used in radical polymerization, can be used. For example, the polymerization is performed in the following polymerization rate (conversion rate) range and then is terminated by adding a polymerization terminator (polymerization inhibitor).

The polymerization rate is preferably 60% or more and more preferably 70% or more, from the viewpoint of excellent productivity. The polymerization rate is preferably 95% or less and more preferably 90% or less, from the viewpoint of suppressing the development of the branched structure or gel formation affecting processability of a sulfur-modified chloroprene rubber to be obtained. From these viewpoints, the polymerization rate is preferably 60 to 95% and more preferably 70 to 90%.

Examples of the polymerization terminator include diethylhydroxyamine, thiodiphenylamine, 4-tert-butylcatechol, and 2,2'-methylenebis-4-methyl-6-tert-butylphenol. The polymerization terminator may be used alone or in combination of two or more kinds thereof.

(Plasticization Step)

In the plasticization step, the polymer obtained in the polymerization step, a thiazole, and an imidazole are mixed. In the plasticization step, by reacting the polymer obtained in the polymerization step, a thiazole, and an imidazole with each other, the polymer can be plasticized, and for example, by adding a thiazole and an imidazole into the polymer solution obtained in the polymerization step, the polymer in the polymer solution can be plasticized. In the plasticization step, for example, a thiazole and an imidazole are reacted with each other to form a reactant having higher reactivity with sulfur (for example, a polysulfide bond (S2 to S8)) in the polymer (for example, the main chain of the polymer) rather than that in the case of using a single substance of a thiazole or a single substance of an imidazole, and thus the Mooney viscosity can be easily adjusted. The reactant reacts with sulfur in the polymer (for example, a polysulfide bond; for example, sulfur in the main chain of the polymer), and thereby the polymer can be cut or depolymerized while the aforementioned terminal functional group A derived from the thiazole and the aforementioned terminal functional group B derived from the imidazole are formed. Hereinafter, chemicals used for cutting or depolymerization of the polymer are referred to as "plasticizer". A vulcanizate obtained by vulcanizing the sulfur-modified chloroprene rubber obtained by the plasticization step has favorable scorch resistance and balance of physical properties of the compression set and the heat resistance of a vulcanizate to be obtained is favorable.

As the thiazole, one or two or more kinds of known thiazoles can be freely selected and used. From the viewpoint of easily obtaining a vulcanizate having excellent scorch resistance and heat resistance and having reduced compression set, the thiazole preferably includes at least one compound selected from N-cyclohexyl-2-benzothiazole sulfenamide, N-cyclohexyl-4-methyl-2-benzothiazole sulfenamide, N-cyclohexyl-4,5-dimethyl-2-benzothiazole sulfenamide, N,N-dicyclohexyl-1,3-benzothiazole-2-sulfenamide, N-(tert-butyl)-2-benzothiazole sulfenamide, N,N-diisopropyl-2-benzothiazole sulfenamide, 4,5-dihydrothiazol-2-sulfenamide, N-cyclohexyl-4,5-dihydrothiazol-2-sulfenamide, N-oxydiethyl benzothiazole-2-sulfenamide, 2-(4'-morpholinyldithio)benzothiazole, 2-mercaptobenzothiazole, 4,5-dihydro-2-mercaptothiazole, dibenzylthiazolyl disulfide, and 2-(morpholinodithio)benzothiazole. From the viewpoint of easily obtaining a vulcanizate having excellent scorch resistance and heat resistance and having reduced compression set, the thiazole preferably includes benzothiazole.

The used amount (addition amount) of the thiazole is preferably 0.2 to 3 parts by mass with respect to 100 parts by mass of the polymer (for example, the polymer in the polymer solution). When the used amount of the thiazole is 0.2 parts by mass or more, the scorch resistance is easily improved and the compression set is easily reduced in a vulcanizate to be obtained. When the used amount of the thiazole is 3 parts by mass or less, a sulfur-modified chloroprene rubber composition having an appropriate Mooney viscosity is easily obtained, and as a result, vulcanization moldability is easily improved. When the used amount of the thiazole is 0.2 to 3 parts by mass, the content of the terminal functional group A in the sulfur-modified chloroprene rubber is easily adjusted to 0.015 to 0.50% by mass (for example, 0.05 to 0.40% by mass; basis: the total amount of the sulfur-modified chloroprene rubber), and the content (residual amount) of the thiazole in the sulfur-modified chloroprene rubber composition is easily adjusted to 0.0001 to 0.0200 parts by mass (for example, 0.0005 to 0.0100 parts by mass; basis: 100 parts by mass of the sulfur-modified chloroprene rubber).

As the imidazole, one or two or more kinds of known imidazoles can be freely selected and used. From the viewpoint of easily obtaining a vulcanizate having excellent scorch resistance and heat resistance and having reduced compression set, the imidazole preferably includes at least one compound selected from 2-mercaptoimidazole, 2-mercaptobenzimidazole, N-cyclohexyl-1H-benzimidazole-2-sulfenamide, 2-methoxycarbonylamino-benzimidazole, 2-mercaptomethylbenzimidazole, 2-mercapto-5-methoxybenzimidazole, 2-mercapto-5-carboxybenzimidazole, sodium 2-mercaptobenzimidazole-5-sulfonate dihydrate, 2-mercapto-5-nitrobenzimidazole, and 2-mercapto-5-aminobenzimidazole. From the viewpoint of easily obtaining a vulcanizate having excellent scorch resistance and heat resistance and having reduced compression set, the imidazole preferably includes a benzimidazole.

The used amount (addition amount) of the imidazole is preferably more than 0 parts by mass and 3 parts by mass or less, more preferably 0.2 to 3 parts by mass, and further preferably 0.5 to 1.2 parts by mass with respect to 100 parts by mass of the polymer (for example, the polymer in the polymer solution), from the viewpoint that the Mooney viscosity of a sulfur-modified chloroprene rubber to be obtained is further easily controlled and the viewpoint that it is easy to further improve the scorch resistance and the heat resistance and the compression set is further reduced in a vulcanizate to be obtained. When the used amount of the imidazole is more than 0 parts by mass and 3 parts by mass or less, the content of the terminal functional group B in the sulfur-modified chloroprene rubber is easily adjusted to more than 0% by mass and 0.50% by mass or less (for example, 0.05 to 0.40% by mass; basis: the total amount of the sulfur-modified chloroprene rubber), and the content (residual amount) of the imidazole in the sulfur-modified chloroprene rubber composition is easily adjusted to more than 0 parts by mass and 0.250 parts by mass or less (for example, 0.005 to 0.200 parts by mass; basis: 100 parts by mass of the sulfur-modified chloroprene rubber).

The sulfur-modified chloroprene rubber may be obtained by performing cooling, pH adjusting, freezing, drying, or the like of the polymer solution subjected to the above-described plasticization step by a general method.

<Sulfur-Modified Chloroprene Rubber Composition, Vulcanizate, and Molded Article>

The sulfur-modified chloroprene rubber composition of the present embodiment contains the sulfur-modified chloroprene rubber of the present embodiment and further contains components other than the sulfur-modified chloroprene rubber. The sulfur-modified chloroprene rubber composition of the present embodiment may contain an unreacted plasticizer (such as a thiazole or an imidazole). As the plasticizer, the plasticizer mentioned above in the plasticization step can be used.

The content of the thiazole (the total amount of compounds corresponding to a thiazole; for example, the residual amount) in the sulfur-modified chloroprene rubber composition is preferably in the following range with respect to 100 parts by mass of the sulfur-modified chloroprene rubber. Furthermore, the content of a specific thiazole (for example, each thiazole exemplified as mentioned above; such as N-cyclohexyl-2-benzothiazole sulfenamide or N-cyclohexyl-4-methyl-2-benzothiazole sulfenamide) in the sulfur-modified chloroprene rubber composition is preferably in the following range with respect to 100 parts by mass of the sulfur-modified chloroprene rubber. The content of the thiazole (for example, the residual amount of an unreacted thiazole) can be adjusted by the amount of the thiazole used in the plasticization step, the plasticization time and the plasticization temperature of the plasticization step, and the like.

The content of the thiazole may be more than 0 parts by mass, and from the viewpoint of further improving the scorch resistance and the heat resistance and further reducing the compression set in a vulcanizate to be obtained, the content of the thiazole is preferably 0.0001 parts by mass or more, 0.0003 parts by mass or more, 0.0004 parts by mass or more, 0.0005 parts by mass or more, 0.0006 parts by mass or more, 0.0010 parts by mass or more, 0.0015 parts by mass or more, or 0.0016 parts by mass or more. The content of the thiazole is preferably 0.0200 parts by mass or less, 0.0150 parts by mass or less, 0.0110 parts by mass or less, 0.0105 parts by mass or less, or 0.0100 parts by mass or less, from the viewpoint of further improving the scorch resistance and the heat resistance and further reducing the compression set in a vulcanizate to be obtained. From these viewpoints, the content of the thiazole is preferably 0.0001 to 0.0200 parts by mass, or 0.0005 to 0.0100 parts by mass. The content of the thiazole may be 0.0020 parts by mass or more, 0.0025 parts by mass or more, 0.0030 parts by mass or more, 0.0035 parts by mass or more, 0.0040 parts by mass or more, 0.0045 parts by mass or more, 0.0050 parts by mass or more, 0.0055 parts by mass or more, 0.0060 parts by mass or more, 0.0070 parts by mass or more, 0.0080 parts by mass or more, 0.0090 parts by mass or more, 0.0100 parts by mass or more, or 0.0105 parts by mass or more. The content of the thiazole may be 0.0090 parts by mass or less, 0.0080 parts by mass or less, 0.0070 parts by mass or less, 0.0060 parts by mass or less, 0.0055 parts by mass or less, 0.0050 parts by mass or less, 0.0045 parts by mass or less, 0.0040 parts by mass or less, 0.0035 parts by mass or less, 0.0030 parts by mass or less, 0.0025 parts by mass or less, 0.0020 parts by mass or less, 0.0016 parts by mass or less, 0.0015 parts by mass or less, 0.0010 parts by mass or less, 0.0006 parts by mass or less, 0.0005 parts by mass or less, or 0.0004 parts by mass or less.

The content of the imidazole (the total amount of compounds corresponding to an imidazole; for example, the residual amount) in the sulfur-modified chloroprene rubber composition is preferably in the following range with respect to 100 parts by mass of the sulfur-modified chloroprene rubber. Furthermore, the content of a specific imidazole (for example, each imidazole exemplified as mentioned above; such as 2-mercaptobenzimidazole or 2-mercapto-5-carboxybenzimidazole) in the sulfur-modified chloroprene rubber composition is preferably in the following range with respect to 100 parts by mass of the sulfur-modified chloroprene rubber. The content of the imidazole (for example, the residual amount of an unreacted imidazole) can be adjusted by the amount of the imidazole used in the plasticization step, the plasticization time and the plasticization temperature of the plasticization step, and the like.

The content of the imidazole may be more than 0 parts by mass, and from the viewpoint of further improving the scorch resistance and the heat resistance and further reducing the compression set in a vulcanizate to be obtained, the content of the imidazole is preferably 0.001 parts by mass or more, 0.003 parts by mass or more, 0.004 parts by mass or more, 0.005 parts by mass or more, 0.010 parts by mass or more, 0.020 parts by mass or more, 0.030 parts by mass or more, 0.040 parts by mass or more, or 0.042 parts by mass or more. The content of the imidazole is preferably 0.250 parts by mass or less, 0.210 parts by mass or less, 0.200 parts by mass or less, 0.150 parts by mass or less, 0.140 parts by mass or less, 0.130 parts by mass or less, 0.124 parts by mass or less, 0.122 parts by mass or less, 0.120 parts by mass or less, 0.110 parts by mass or less, or 0.100 parts by mass or less, from the viewpoint of further improving the scorch resistance and the heat resistance and further reducing the compression set in a vulcanizate to be obtained. From these viewpoints, the content of the imidazole is preferably more than 0 parts by mass and 0.250 parts by mass or less, 0.001 to 0.250 parts by mass, or 0.005 to 0.200 parts by mass. The content of the imidazole may be 0.045 parts by mass or more, 0.050 parts by mass or more, 0.060 parts by mass or more, 0.070 parts by mass or more, 0.080 parts by mass or more, 0.090 parts by mass or more, 0.094 parts by mass or more, 0.100 parts by mass or more, 0.110 parts by mass or more, 0.120 parts by mass or more, 0.122 parts by mass or more, 0.124 parts by mass or more, 0.130 parts by mass or more, 0.140 parts by mass or more, 0.150 parts by mass or more, 0.200 parts by mass or more, or 0.210 parts by mass or more. The content of the imidazole may be 0.090 parts by mass or less, 0.080 parts by mass or less, 0.070 parts by mass or less, 0.060 parts by mass or less, 0.050 parts by mass or less, 0.045 parts by mass or less, 0.042 parts by mass or less, 0.040 parts by mass or less, 0.030 parts by mass or less, 0.020 parts by mass or less, 0.010 parts by mass or less, or 0.005 parts by mass or less.

In the sulfur-modified chloroprene rubber composition, the mass ratio D/C of the content (for example, residual amount) D of the imidazole with respect to the content (for example, residual amount) C of the thiazole is preferably in the following range. The mass ratio D/C is preferably 300 or less, 250 or less, 220 or less, 200 or less, 150 or less, 120 or less, 100 or less, 80 or less, 50 or less, 40 or less, 30 or less, or 21 or less, from the viewpoint of further favorable balance of physical properties of the scorch resistance, the compression set, and the heat resistance of a vulcanizate to be obtained. The mass ratio D/C is 0 or more, and from the viewpoint of further favorable balance of physical properties of the scorch resistance, the compression set, and the heat resistance of a vulcanizate to be obtained, the mass ratio D/C is preferably more than 0 and more preferably 1 or more, 3 or more, 5 or more, 9 or more, 10 or more, 12 or more, or 15 or more. From these viewpoints, the mass ratio D/C is preferably 0 to 300 or 0 to 200. The mass ratio D/C may be 20 or less, 15 or less, 12 or less, 10 or less, 9 or less, 5 or less, or 3 or less. The mass ratio D/C may be 20 or more, 21 or more, 30 or more, 40 or more, 50 or more, 80 or more, 100 or more, 120 or more, 150 or more, 200 or more, or 220 or more.

The content of the thiazole and the content of the imidazole in the sulfur-modified chloroprene rubber composition can be quantified by the procedure described in Examples.

The sulfur-modified chloroprene rubber composition may contain additives such as a vulcanizing agent, a processing aid, a stabilizer, a metal compound, a plasticizer, or a filler.

Examples of the vulcanizing agent include a metal oxide. Examples of the metal oxide include zinc oxide, magnesium oxide, lead oxide, trilead tetraoxide, iron trioxide, titanium dioxide, calcium oxide, and hydrotalcite. The vulcanizing agent may be used alone or in combination of two or more kinds thereof. The content of the vulcanizing agent is preferably 3 to 15 parts by mass with respect to 100 parts by mass of the sulfur-modified chloroprene rubber.

Examples of the processing aid include fatty acids such as stearic acid; paraffin-based processing aids such as polyethylene; and fatty acid amides. The processing aid may be used alone or in combination of two or more kinds thereof. The content of the processing aid is preferably 0.5 to 5 parts by mass with respect to 100 parts by mass of the sulfur-modified chloroprene rubber.

The sulfur-modified chloroprene rubber composition can contain a stabilizer (for example, a small amount of a stabilizer) for preventing a change in Mooney viscosity during storage. As a stabilizer, one or two or more kinds of known stabilizers, which can be used in the chloroprene rubber, can be freely selected and used. Examples of the stabilizer include phenyl-α-naphthylamine, octylated diphenylamine, 2,6-di-tert-butyl-4-phenylphenol, 2,2'-methylenebis(4-methyl-6-tert-butylphenol), and 4,4'-thiobis-(6-tert-butyl-3-methylphenol). As the stabilizer, from the viewpoint of easily obtaining a vulcanizate having excellent scorch resistance and heat resistance and having reduced compression set, at least one selected from octylated diphenylamine and 4,4'-thiobis-(6-tert-butyl-3-methylphenol is preferred.

A metal compound is a compound which can be added for adjusting the vulcanization rate of the sulfur-modified chloroprene rubber or suppressing the degradation of the sulfur-modified chloroprene rubber by adsorbing chlorine sources such as hydrogen chloride generated by dehydrochlorination reaction of the sulfur-modified chloroprene rubber. As the metal compound, oxides, hydroxides, or the like of zinc, titanium, magnesium, lead, iron, beryllium, calcium, barium, germanium, zirconium, vanadium, molybdenum, tungsten, or the like can be used. The metal compound may be used alone or in combination of two or more kinds thereof.

The content of the metal compound is not particularly limited, and is preferably in a range of 3 to 15 parts by mass with respect to 100 parts by mass of the sulfur-modified chloroprene rubber. When the content of the metal compound is adjusted to this range, the mechanical strength of a sulfur-modified chloroprene rubber composition to be obtained can be improved.

A plasticizer is a component which can be added for lowering the hardness of the sulfur-modified chloroprene rubber and improving low-temperature properties thereof. Furthermore, when a sponge is produced using the sulfur-modified chloroprene rubber composition, the texture of this sponge can also be improved. Examples of the plasticizer include dioctyl phthalate, dioctyl adipate {also known as bis(2-ethylhexyl) adipate}, white oils, silicone oils, naphthene oils, aroma oils, triphenyl phosphate, and tricresyl phosphate. The plasticizer may be used alone or in combination of two or more kinds thereof.

The content of the plasticizer is not particularly limited, and is preferably in a range of 50 parts by mass or less with respect to 100 parts by mass of the sulfur-modified chloroprene rubber. When the content of the plasticizer is adjusted to this range, it is possible to obtain a vulcanizate having excellent scorch resistance and heat resistance and having reduced compression set while maintaining the tear strength of a sulfur-modified chloroprene rubber to be obtained.

A filler is a component which can be added as a reinforcing agent for the sulfur-modified chloroprene rubber. Examples of the filler include carbon black, silica, clay, talc, and calcium carbonate. The filler may be used alone or in combination of two or more kinds thereof.

The content of the filler is not particularly limited, and is preferably in a range of 100 parts by mass or less with respect to 100 parts by mass of the sulfur-modified chloroprene rubber. When the content of the filler is adjusted to this range, it is possible to obtain a vulcanizate having excellent scorch resistance and heat resistance and having reduced compression set while suitably maintaining the molding processability of the sulfur-modified chloroprene rubber composition.

The Mooney viscosity ($ML_{1+4}$, 100° C.) of the sulfur-modified chloroprene rubber composition is not particularly limited, and is preferably in the following range. The Mooney viscosity is preferably 10 or more, 15 or more, 20 or more, 25 or more, or 30 or more, from the viewpoint of easily maintaining the processability of the sulfur-modified chloroprene rubber composition. The Mooney viscosity is preferably 90 or less, 85 or less, 80 or less, 75 or less, 70 or less, 65 or less, 60 or less, or 55 or less, from the viewpoint of easily maintaining the processability of the sulfur-modified chloroprene rubber composition. From these viewpoints, the Mooney viscosity is preferably 10 to 90 or 20 to 80. The Mooney viscosity of the sulfur-modified chloroprene rubber composition can be adjusted by the addition amount of the plasticizer, the time and the plasticization temperature of the plasticization step, and the like.

A vulcanizate of the present embodiment is a vulcanizate of the sulfur-modified chloroprene rubber of the present embodiment or a vulcanizate of the sulfur-modified chloroprene rubber composition of the present embodiment, and can be obtained by subjecting the sulfur-modified chloroprene rubber of the present embodiment or the sulfur-modified chloroprene rubber in the sulfur-modified chloroprene rubber composition to a vulcanization treatment.

A molded article of the present embodiment is a molded article composed of the vulcanizate of the present embodiment and can be obtained by molding the vulcanizate of the present embodiment. Examples of the molded article include a transmission belt, a conveyor belt, a vibration-proof rubber, an air spring (for example, an automobile air spring), a hose (a hose product), and a sponge (a sponge product). A molded article may be obtained by, after mixing the constituents (such as the sulfur-modified chloroprene rubber, the metal compound, the plasticizer, and the filler) of the sulfur-modified chloroprene rubber composition, molding in a desired shape and then performing a vulcanization treatment. Furthermore, a molded article may be obtained by, after mixing the constituents of the sulfur-modified chloroprene rubber composition, performing a vulcanization treatment and then molding in a desired shape. The constituents of the sulfur-modified chloroprene rubber composition can be mixed using a roll, a banbury mixer, an extruder, or the like.

EXAMPLES

Hereinafter, the present invention will be more specifically described on the basis of Examples. Examples described below are only typical exemplary Examples of the present invention and the scope of the present invention is not restricted thereby at all.

<Preparation of Sulfur-Modified Chloroprene Rubber>

Example 1

To a polymerization tank having an inner volume of 30 L, 100 parts by mass of chloroprene, 0.55 parts by mass of sulfur, 120 parts by mass of pure water, 4.00 parts by mass of disproportionated potassium rosinate (manufactured by Harima Chemicals, Inc.), 0.60 parts by mass of sodium hydroxide, and 0.6 parts by mass of a sodium salt of β-naphthalene sulfonic acid formalin condensate (trade name "DEMOL N": manufactured by Kao Corporation) were added. The pH of the aqueous emulsion before polymerization initiation was 12.8. 0.1 parts by mass of potassium persulfate was added as a polymerization initiator, and then emulsion polymerization was performed under a nitrogen flow at a polymerization temperature of 40° C. 0.05 parts by mass of diethylhydroxyamine as a polymerization terminator was added at the time point of a conversion rate of 85% to terminate the polymerization, thereby obtaining a chloroprene polymer solution.

To the polymer solution thus obtained, a plasticizer emulsion, which was composed of 5 parts by mass of chloroprene (solvent), 1 part by mass of N-cyclohexyl-2-benzothiazole sulfenamide (plasticizer, trade name "NOCCELER CZ": manufactured by OUCHI SHINKO CHEMICAL INDUSTRIAL CO., LTD.), 1 part by mass of 2-mercaptobenzimidazole (plasticizer, trade name "NOCRAC MB": manufactured by OUCHI SHINKO CHEMICAL INDUSTRIAL CO., LTD.), 0.05 parts by mass of a sodium salt of β-naphthalene sulfonic acid formalin condensate (emulsifier), and 0.05 parts by mass of sodium laurylsulfate (emulsifier), was added, thereby obtaining a sulfur-modified chloroprene polymer latex before plasticization. In this operation, from the viewpoint that plasticization can be more stably performed, a plasticizer emulsion in an emulsified state was obtained by adding sodium laurylsulfate or the like to a plasticizer solution, which was obtained by dissolving a plasticizer in chloroprene (solvent), and then this plasticizer emulsion was added to the polymer solution.

The sulfur-modified chloroprene polymer latex thus obtained was distilled under reduced pressure to remove unreacted monomers, and then was plasticized at a temperature of 50° C. for 1 hour while being stirred, and thereby a crude rubber containing the sulfur-modified chloroprene rubber (latex after plasticization) was obtained. The "crude rubber" is a sulfur-modified chloroprene rubber composition which may contain an unreacted plasticizer or the like.

[Analysis of Content of Terminal Functional Group]

The crude rubber was cooled, and then the polymer was isolated by a common freeze-solidification method to obtain a sulfur-modified chloroprene rubber. On the basis of the total amount of the sulfur-modified chloroprene rubber, the content of the terminal functional group derived from N-cyclohexyl-2-benzothiazole sulfenamide represented by Formula (A1) below (thiazole terminal species A1) was 0.15% by mass, and the content of the terminal functional group derived from 2-mercaptobenzimidazole represented by Formula (B1) below (imidazole terminal species B1) was 0.13% by mass.

[Chemical Formula 6]

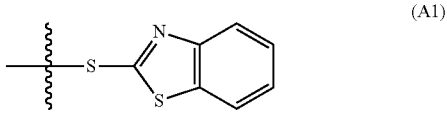

(A1)

[Chemical Formula 7]

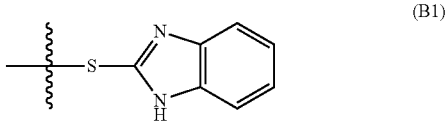

(B1)

The content of the terminal functional group in the sulfur-modified chloroprene rubber was quantified by the following procedure. First, the sulfur-modified chloroprene rubber was purified with benzene and methanol and then freeze-dried again to obtain a sample for measurement. $^1$H-NMR measurement was performed using this sample for measurement according to JIS K-6239. The measurement data thus obtained were corrected on the basis of the peak (7.24 ppm) of chloroform in deuterated chloroform used as a solvent, and on the basis of the corrected measurement data, the area of peaks having peak tops at 7.72 to 7.83 ppm was calculated to quantify the content of the terminal functional group (thiazole terminal species). Furthermore, the measurement data thus obtained were corrected on the basis of the peak (2.49 ppm) of dimethylsulfoxide in deuterated dimethylsulfoxide used as a solvent, and on the basis of the corrected measurement data, the area of peaks having a peak top at 6.99 to 7.23 ppm was calculated to quantify the content of the terminal functional group (imidazole terminal species).

[Measurement of Residual Amount of Plasticizer]

The content (residual amount) of the plasticizer in the crude rubber with respect to 100 parts by mass of the sulfur-modified chloroprene rubber was quantified by the following procedure. First, 1.5 g of the crude rubber thus obtained was dissolved in 30 mL of benzene, and then 60 mL of methanol was added dropwise thereto. Thereby, the rubber component (polymer component) was precipitated and separated from the solvent, and the liquid phase containing a non-rubber component as a solvent-soluble component was recovered. Dissolving with benzene and dropwise addition of methanol were performed again with respect to the precipitate by the same procedures, and thereby the rubber component was separated and the liquid phase containing a non-rubber component as a solvent-soluble component was recovered. The first and second liquid phases were mixed and then fixed to a constant volume of 200 mL to obtain a liquid as a sample for measurement. 20 µL of this sample for measurement was injected to a liquid chromatograph (LC, manufactured by Hitachi, Ltd., pump: L-6200, L-600, UV detector: L-4250). The mobile phase of the liquid chromatograph was used while changing the ratio of acetonitrile and water, and was flowed at a flow rate of 1 mL/min. As a column, Inertsil ODS-3 (φ4.6×150 mm, 5 m, manufactured by GL Sciences Inc.) was used. The peak detection time was checked using 0.05 ppm, 0.10 ppm, and 1.00 ppm of standard solutions of thiazole (measurement wavelength: 300 nm) and 0.05 ppm, 0.10 ppm, and 1.00 ppm of standard solutions of imidazole (measurement wavelength: 300 nm), and a quantitative value was obtained by a standard curve obtained from the peak area thereof. By comparison between this quantitative value and the amount of the sample used in analysis, the contents of the unreacted thiazole and the unreacted imidazole in the crude rubber were obtained.

Example 2

A crude rubber was obtained by the same method as in Example 1, except that, as a plasticizer, the addition amount of N-cyclohexyl-2-benzothiazole sulfenamide was changed from 1 part by mass to 0.5 parts by mass, and the addition amount of 2-mercaptobenzimidazole was changed from 1 part by mass to 2 parts by mass.

Example 3

A crude rubber was obtained by the same method as in Example 1, except that, as a plasticizer, the addition amount of N-cyclohexyl-2-benzothiazole sulfenamide was changed from 1 part by mass to 2 parts by mass, and the addition amount of 2-mercaptobenzimidazole was changed from 1 part by mass to 0.5 parts by mass.

Example 4

A crude rubber was obtained by the same method as in Example 1, except that the addition amount of N-cyclohexyl-2-benzothiazole sulfenamide as a plasticizer was changed from 1 part by mass to 4 parts by mass.

Example 5

A crude rubber was obtained by the same method as in Example 1, except that the addition amount of 2-mercaptobenzimidazole as a plasticizer was changed from 1 part by mass to 0.3 parts by mass.

Example 6

A crude rubber was obtained by the same method as in Example 1, except that, as a plasticizer, the addition amount of N-cyclohexyl-2-benzothiazole sulfenamide was changed from 1 part by mass to 0.3 parts by mass, and the addition amount of 2-mercaptobenzimidazole was changed from 1 part by mass to 2 parts by mass.

Example 7

A crude rubber was obtained by the same method as in Example 1, except that the addition amount of N-cyclohexyl-2-benzothiazole sulfenamide as a plasticizer was changed from 1 part by mass to 0.3 parts by mass, and the plasticization retention time was changed from 1 hour to 3 hours.

Example 8

A crude rubber was obtained by the same method as in Example 1, except that the addition amount of 2-mercaptobenzimidazole as a plasticizer was changed from 1 part by mass to 0.3 parts by mass, and the plasticization retention time was changed from 1 hour to 3 hours.

Example 9

A crude rubber was obtained by the same method as in Example 1, except that the addition amount of N-cyclohexyl-2-benzothiazole sulfenamide as a plasticizer was changed from 1 part by mass to 1.5 parts by mass, and the plasticization retention time was changed from 1 hour to 15 minutes.

Example 10

A crude rubber was obtained by the same method as in Example 1, except that the addition amount of 2-mercaptobenzimidazole as a plasticizer was changed from 1 part by mass to 1.5 parts by mass, and the plasticization retention time was changed from 1 hour to 15 minutes.

Example 11

A crude rubber was obtained by the same method as in Example 1, except that, as a plasticizer, N-cyclohexyl-2-benzothiazole sulfenamide was changed to N-cyclohexyl-4-methyl-2-benzothiazole sulfenamide represented by Formula (A2) below (manufactured by Chemieliva pharma & Chem Co., LTD.). On the basis of the total amount of the sulfur-modified chloroprene rubber, the content of the terminal functional group derived from N-cyclohexyl-4-methyl-2-benzothiazole sulfenamide (thiazole terminal species A2) was 0.15% by mass, and the content of the terminal functional group derived from 2-mercaptobenzimidazole represented by Formula (B1) mentioned above (imidazole terminal species B1) was 0.17% by mass.

[Chemical Formula 8]

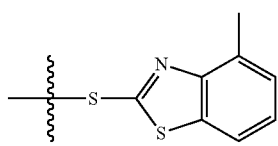

(A2)

Example 12

A crude rubber was obtained by the same method as in Example 1, except that, as a plasticizer, 2-mercaptobenzimidazole was changed to 2-mercapto-5-carboxybenzimidazole represented by Formula (B2) below (trade name "2MB5C", manufactured by Kawaguchi Chemical Industry Co., LTD.). On the basis of the total amount of the sulfur-modified chloroprene rubber, the content of the terminal functional group derived from N-cyclohexyl-2-benzothiazole sulfenamide represented by Formula (A1) mentioned above (thiazole terminal species A1) was 0.16% by mass, and the content of the terminal functional group derived from 2-mercapto-5-carboxybenzimidazole (imidazole terminal species B2) was 0.13% by mass.

[Chemical Formula 9]

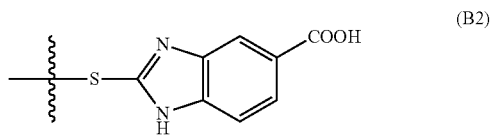

(B2)

Example 13

A crude rubber was obtained by the same method as in Example 1, except that, as a plasticizer, N-cyclohexyl-2-benzothiazole sulfenamide was changed to N-cyclohexyl-4-methyl-2-benzothiazole sulfenamide represented by Formula (A2) mentioned above, and 2-mercaptobenzimidazole was changed to 2-mercapto-5-carboxybenzimidazole represented by Formula (B2) mentioned above. On the basis of the total amount of the sulfur-modified chloroprene rubber, the content of the terminal functional group derived from N-cyclohexyl-4-methyl-2-benzothiazole sulfenamide (thiazole terminal species A2) was 0.14% by mass, and the content of the terminal functional group derived from 2-mercapto-5-carboxybenzimidazole (imidazole terminal species B2) was 0.16% by mass.

Comparative Example 1

A crude rubber was obtained by the same method as in Example 1, except that, as a plasticizer, the addition amount of N-cyclohexyl-2-benzothiazole sulfenamide was changed from 1 part by mass to 3 parts by mass, and the addition amount of 2-mercaptobenzimidazole was changed from 1 part by mass to 3 parts by mass.

Comparative Example 2

A crude rubber was obtained by the same method as in Example 1, except that, as a plasticizer, the addition amount of N-cyclohexyl-2-benzothiazole sulfenamide was changed from 1 part by mass to 0.3 parts by mass, and the addition amount of 2-mercaptobenzimidazole was changed from 1 part by mass to 0.3 parts by mass.

Comparative Example 3

A crude rubber was obtained by the same method as in Example 1, except that, as a plasticizer, the addition amount of N-cyclohexyl-2-benzothiazole sulfenamide was changed from 1 part by mass to 0.3 parts by mass, and the addition amount of 2-mercaptobenzimidazole was changed from 1 part by mass to 3 parts by mass.

Comparative Example 4

A crude rubber was obtained by the same method as in Example 1, except that, as a plasticizer, N-cyclohexyl-2- benzothiazole sulfenamide and 2-mercaptobenzimidazole were changed to tetraethylthiuram disulfide represented by formula below, and the addition amount thereof was changed to 2.5 parts by mass. On the basis of the total amount of the sulfur-modified chloroprene rubber, the content of the terminal functional group derived from tetraethylthiuram disulfide was 0.26% by mass.

[Chemical Formula 10]

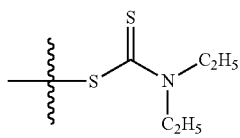

<Measurement of Mooney Viscosity>

Regarding the crude rubbers of Examples 1 to 13 and Comparative Examples 1 to 4, the Mooney viscosity ($ML_{1+4}$) was measured according to JIS K 6300-1 under conditions of a type-L-rotor-preheating time of 1 minute, a rotation time of 4 minutes, and a test temperature of 100° C. The Mooney viscosity of the crude rubber of Comparative Example 1 was too low and thus was unmeasurable.

Evaluation (Preparation of Sample)

1.0 part by mass of stearic acid, 2.0 parts by mass of octylated diphenylamine, 4.0 parts by mass of magnesium oxide, 40 parts by mass of carbon black (GPF), and 5.0 parts by mass of zinc oxide were mixed with 100 parts by mass of the crude rubber of each of Examples 1 to 13 and Comparative Examples 1 to 4, using an 8-inch roll, and then crosslinking under pressure was performed at 160° C. for 20 minutes to prepare a sample (vulcanizate) for evaluation. In Comparative Example 1, since the Mooney viscosity of the crude rubber was too low, a sample could not be prepared, and thus each evaluation was not performed.

(Scorch Resistance)

Regarding each sample mentioned above, a Mooney scorch test was performed according to JIS K 6300-1.

(Compression Set)

Regarding each sample mentioned above, compression set was measured according to JIS K 6262 under the test condition of 100° C. for 72 hours.

(Heat Resistance)

Each sample mentioned above was held under an aging-accelerating environment of 100° C. (using a gear-type aging test machine GPHH-201 Type, manufactured by ESPEC CORP.) according to method A of JIS K 6257 for 72 hours, the durometer hardness (Hs) before and after an aging-accelerating treatment was then measured, and the amount of change therein was obtained as an index of the heat resistance. The durometer hardness was measured according to JIS K 6253-3 at 23° C. in a state where three sheets of samples (vulcanized molded article sheets) mentioned above were stacked. The hardness meter used was Asker Rubber Durometer type A (manufactured by Kobunshi Keiki Co., Ltd.). A smaller amount of change was evaluated to be better.

Result

Results of Examples are presented in the following Table 1 and Table 2, and results of Comparative Examples are presented in the following Table 3.

TABLE 1

| | | | Unit | Example 1 | 2 | 3 | 4 | 5 | 6 | 7 |
|---|---|---|---|---|---|---|---|---|---|---|
| Content of terminal functional group in sulfur-modified chloroprene rubber | Terminal functional group A | Thiazole terminal species A1 | % by mass | 0.15 | 0.06 | 0.23 | 0.43 | 0.13 | 0.04 | 0.08 |
| | | Thiazole terminal species A2 | | — | — | — | — | — | — | — |
| | Terminal functional group B | Imidazole terminal species B1 | | 0.13 | 0.22 | 0.07 | 0.13 | 0.06 | 0.23 | 0.21 |
| | | Imidazole terminal species B2 | | — | — | — | — | — | — | — |
| | | B/A | — | 0.87 | 3.67 | 0.30 | 0.30 | 0.46 | 5.75 | 2.63 |
| | | A + B | % by mass | 0.28 | 0.28 | 0.30 | 0.56 | 0.19 | 0.27 | 0.29 |
| Content of plasticizer with respect to 100 parts by mass of sulfur-modified chloroprene rubber in crude rubber | Thiazole (C) | N-Cyclohexyl-2-benzothiazole sulfenamide | parts by mass | 0.0045 | 0.0010 | 0.0054 | 0.0089 | 0.0028 | 0.0006 | 0.0004 |
| | | N-Cyclohexyl-4-methyl-2-benzothiazole sulfenamide | | — | — | — | — | — | — | — |
| | Imidazole (D) | 2-Mercaptobenzimidazole | | 0.094 | 0.122 | 0.049 | 0.091 | 0.042 | 0.132 | 0.081 |
| | | 2-Mercapto-5-cathoxybenzimidazole | | — | — | — | — | — | — | — |
| | | D/C | — | 21 | 122 | 9 | 10 | 15 | 220 | 188 |
| Mooney viscosity ($ML_{1+4}$ at 100° C.) of crude rubber | | | — | 53 | 42 | 49 | 19 | 81 | 58 | 52 |
| Evaluation | Scorch time (125° C., t5) | | min | 30 | 31 | 36 | 40 | 20 | 28 | 26 |
| | Compression set (100° C. 72 hr) | | % | 54 | 57 | 56 | 55 | 53 | 58 | 57 |
| | Heat resistance (100° C. 72 hr, ΔHs) | | pt. | +2 | +3 | +4 | +4 | +3 | +4 | +3 |

TABLE 2

| | | | Unit | Example 8 | 9 | 10 | 11 | 12 | 13 |
|---|---|---|---|---|---|---|---|---|---|
| Content of terminal functional group in sulfur-modified chloroprene rubber | Terminal functional group A | Thiazole terminal species A1 | % by mass | 0.15 | 0.38 | 0.11 | — | 0.16 | — |
| | | Thiazole terminal species A2 | | — | — | — | 0.15 | — | 0.14 |
| | Terminal functional group B | Imidazole terminal species B1 | | 0.07 | 0.09 | 0.35 | 0.17 | — | — |
| | | Imidazole terminal species B2 | | — | — | — | — | 0.13 | 0.16 |
| | | B/A | — | 0.47 | 0.24 | 3.18 | 0.88 | 1.23 | 0.88 |
| | | A + B | % by mass | 0.22 | 0.47 | 0.46 | 0.32 | 0.29 | 0.30 |
| Content of plasticizer with respect to 100 parts by mass of sulfur-modified chloroprene rubber in crude rubber | Thiazole (C) | N-Cyclohexyl-2-benzothiazole sulfenamide | parts by mass | 0.0016 | 0.0105 | 0.0062 | — | 0.0041 | — |
| | | N-Cyclohexyl-4-methyl-2-benzothiazole sulfenamide | | — | — | — | 0.0040 | — | 0.0033 |
| | Imidazole (D) | 2-Mercaptobenzimidazole | | 0.0042 | 0.124 | 0.213 | 0.086 | — | — |
| | | 2-Mercapto-5-cathoxybenzimidazole | | — | — | — | — | 0.075 | 0.084 |
| | | D/C | — | 3 | 12 | 34 | 22 | 18 | 25 |
| Mooney viscosity (ML$_{1+4}$ at 100° C.) of crude rubber | | | — | 41 | 26 | 24 | 55 | 58 | 59 |
| Evaluation | Scorch time (125° C., t5) | | min | 32 | 37 | 35 | 29 | 25 | 27 |
| | Compression set (100° C. 72 hr) | | % | 53 | 56 | 60 | 57 | 53 | 55 |
| | Heat resistance (100° C. 72 hr, ΔHs) | | pt. | +4 | +4 | +4 | +3 | +3 | +3 |

TABLE 3

| | | | Unit | Comparative Example 1 | 2 | 3 | 4 |
|---|---|---|---|---|---|---|---|
| Content of terminal functional group in sulfur-modified chloroprene rubber | Terminal functional group A | Thiazole terminal species A1 | % by mass | 0.32 | 0.05 | 0.05 | — |
| | Terminal functional group B | Imidazole terminal species B1 | | 0.29 | 0.04 | 0.33 | — |
| | | Terminal functional group derived from tetraethylthiuram disulfide | | — | — | — | 0.26 |
| | | B/A | | 0.91 | 0.80 | 6.60 | — |
| | | A + B | % by mass | 0.61 | 0.09 | 0.38 | — |
| Content of plasticizer with respect to 100 parts by mass of sulfur-modified chloroprene rubber in crude rubber | Thiazole (C) | N-Cyclohexyl-2-benzothiazole sulfenamide | parts by mass | 0.0074 | 0.0010 | 0.0014 | — |
| | Imidazole (D) | 2-Mercaptobenzimidazole | | 0.143 | 0.009 | 0.148 | — |
| | | D/C | — | 19 | 9 | 106 | — |
| Mooney viscosity (ML$_{1+4}$ at 100° C.) of crude rubber | | | — | X | 132 | 28 | 56 |
| Evaluation | Scorch time (125° C., t5) | | min | — | 12 | 26 | 19 |
| | Compression set (100° C. 72 hr) | | % | — | 63 | 61 | 61 |
| | Heat resistance (100° C. 72 hr, ΔHs) | | pt. | — | +6 | +5 | +5 |

As presented in Tables 1 to 3, it could be confirmed that vulcanizates obtained using the sulfur-modified chloroprene rubbers of Examples 1 to 13 are excellent in scorch resistance and heat resistance and have reduced compression set. Even in the case of using a thiazole and an imidazole, in Comparative Example 1 in which the total content (A+B) of the terminal functional groups in the sulfur-modified chloroprene rubber is more than 0.60% by mass, the Mooney viscosity was too low, and thus an evaluation sample (vulcanizate) could not been prepared.

The invention claimed is:

1. A sulfur-modified chloroprene rubber comprising a functional group A represented by General Formula (A) below and positioned at a molecular terminal and a functional group B represented by General Formula (B) below and positioned at a molecular terminal, wherein a mass ratio B/A of a content of the functional group B with respect to a content of the functional group A is more than 0 and 6.00 or less, and a total amount of the functional group A and the functional group B is 0.10 to 0.60% by mass,

[Chemical Formula 1]

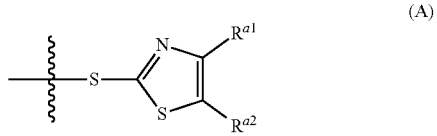

(A)

(In the formula, $R^{a1}$ and $R^{a2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, and $R^{a1}$ and $R^{a2}$ may bond with each other to form a ring which may have a substituent,)

[Chemical Formula 2]

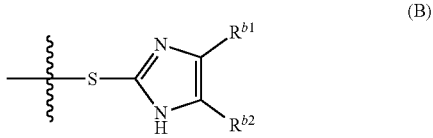

(B)

(In the formula, $R^{b1}$ and $R^{b2}$ each independently represent a hydrogen atom, a halogen atom, a hydroxy group, an alkoxy group, a carboxy group, a carboxylate group, a cyano group, an alkyl group which may have a substituent, or an arylthio group which may have a substituent, and $R^{b1}$ and $R^{b2}$ may bond with each other to form a ring which may have a substituent).

2. The sulfur-modified chloroprene rubber according to claim 1, wherein a content of the functional group A is 0.05 to 0.40% by mass.

3. The sulfur-modified chloroprene rubber according to claim 1 or 2, wherein a content of the functional group B is 0.05 to 0.40% by mass.

4. A sulfur-modified chloroprene rubber composition comprising the sulfur-modified chloroprene rubber according to claim 1.

5. The sulfur-modified chloroprene rubber composition according to claim 4, wherein a content of a thiazole is 0.0005 to 0.0100 parts by mass with respect to 100 parts by mass of the sulfur-modified chloroprene rubber.

6. The sulfur-modified chloroprene rubber composition according to claim 5, wherein the thiazole comprises at least one compound selected from N-cyclohexyl-2-benzothiazole sulfenamide, N-cyclohexyl-4-methyl-2-benzothiazole sulfenamide, N-cyclohexyl-4,5-dimethyl-2-benzothiazole sulfenamide, N,N-dicyclohexyl-1,3-benzothiazole-2-sulfenamide, N-(tert-butyl)-2-benzothiazole sulfenamide, N,N-diisopropyl-2-benzothiazole sulfenamide, 4,5-dihydrothiazol-2-sulfenamide, N-cyclohexyl-4,5-dihydrothiazol-2-sulfenamide, N-oxydiethyl benzothiazole-2-sulfenamide, 2-(4'-morpholinyldithio)benzothiazole, 2-mercaptobenzothiazole, 4,5-dihydro-2-mercaptothiazole, dibenzylthiazolyl disulfide, and 2-(morpholinodithio)benzothiazole.

7. The sulfur-modified chloroprene rubber composition according to claim 4, wherein a content of an imidazole is 0.005 to 0.200 parts by mass with respect to 100 parts by mass of the sulfur-modified chloroprene rubber.

8. The sulfur-modified chloroprene rubber composition according to claim 7, wherein the imidazole comprises at least one compound selected from 2-mercaptoimidazole, 2-mercaptobenzimidazole, N-cyclohexyl-1H-benzimidazole-2-sulfenamide, 2-methoxycarbonylamino-benzimidazole, 2-mercaptomethylbenzimidazole, 2-mercapto-5-methoxybenzimidazole, 2-mercapto-5-carboxybenzimidazole, sodium 2-mercaptobenzimidazole-5-sulfonate dihydrate, 2-mercapto-5-nitrobenzimidazole, and 2-mercapto-5-aminobenzimidazole.

9. The sulfur-modified chloroprene rubber composition according to claim 4, wherein a mass ratio D/C of a content D of an imidazole with respect to a content C of a thiazole is 200 or less.

10. The sulfur-modified chloroprene rubber composition according to claim 4, wherein a Mooney viscosity is 20 to 80.

11. A vulcanizate of the sulfur-modified chloroprene rubber according to claim 1.

12. A molded article composed of the vulcanizate according to claim 11.

13. The molded article according to claim 12, wherein the molded article is a transmission belt, a conveyor belt, a vibration-proof rubber, an air spring, a hose, or a sponge.

14. A method for producing the sulfur-modified chloroprene rubber according to claim 1, the method comprising:
a step of subjecting chloroprene to emulsion polymerization in the presence of sulfur to obtain a polymer; and
a mixing step of mixing the polymer, a thiazole, and an imidazole.

15. A vulcanizate of the sulfur-modified chloroprene rubber composition according to claim 4.

16. A molded article composed of the vulcanizate according to claim 15.

17. The molded article according to claim 16, wherein the molded article is a transmission belt, a conveyor belt, a vibration-proof rubber, an air spring, a hose, or a sponge.

18. A method for producing the sulfur-modified chloroprene rubber of the sulfur-modified chloroprene rubber composition according to claim 4, the method comprising:
a step of subjecting chloroprene to emulsion polymerization in the presence of sulfur to obtain a polymer; and
a mixing step of mixing the polymer, a thiazole, and an imidazole.

* * * * *